United States Patent [19]

Vitner

[11] 4,134,427
[45] Jan. 16, 1979

[54] FLOW SPLITTER

[76] Inventor: Joseph Vitner, 27 Grand Ave., Waldwick, N.J. 07463

[21] Appl. No.: 632,659

[22] Filed: Nov. 17, 1975

[51] Int. Cl.$^2$ .............................................. F16K 11/00
[52] U.S. Cl. .................................................. 137/876
[58] Field of Search ............... 137/610, 611, 612, 262, 137/625.46, 561 R, 561 A, 83, 829, 831, 876

[56] References Cited

U.S. PATENT DOCUMENTS

| | | | |
|---|---|---|---|
| 1,882,953 | 10/1932 | Saelzler | 137/610 |
| 2,508,762 | 5/1950 | Lapple | 137/262 |
| 2,625,952 | 1/1953 | Eide et al. | 137/612 |
| 3,223,103 | 12/1965 | Trinkler | 137/83 |
| 3,423,913 | 1/1969 | Mecklin | 137/262 |
| 3,509,775 | 5/1970 | Evans | 137/829 |
| 3,542,051 | 11/1970 | McFadden et al. | 137/83 |
| 3,747,622 | 7/1973 | Reinhall | 137/262 |
| 3,802,563 | 4/1974 | Sasaki et al. | 137/610 |

Primary Examiner—William R. Cline
Assistant Examiner—H. Jay Spiegel
Attorney, Agent, or Firm—Cushman, Darby & Cushman

[57] ABSTRACT

The present invention relates to a device for accurately controlling the splitting and/or proportionalizing of a flowing liquid into two preset flows. The device is capable of maintaining the desired preset quantitative relationship between incoming and outgoing flows regardless of the flow characteristics of the incoming liquid. The incoming liquid is directed to a distributor located within a collector housing and regardless of the incoming flow rate, is fed uniformly in the form of a flat sheet or curtain into the collector(s). The collector is divided into two collector chambers by partitions located on opposite sides of a central column with the flow distributor connected to a shaft rotatably mounted within the central column so as to place one of the partitions in the flow path of the liquid emerging from the distributor, thereby splitting that flow. Connected to the bottom and outer end of the rotatably mounted shaft is a scale which indicates the relationship between the flow distributor to the partition in the distribution flow path.

10 Claims, 10 Drawing Figures

FLOW SPLITTER

This invention relates to an apparatus which allows the continuous splitting of flowing liquids into at least two output streams with each output stream being a specific, predetermined ratio of the input stream. Typically, this apparatus is used as a reflux splitter as part of an industrial distillation column, but it should be understood that the present invention can be used in any application where it is desirable or necessary to proportionalize a liquid into a number of outlet streams. The splitter can also be used as a supplement to a feeding pump for chemical reactors, allowing adjustments in the flowrates of addition between 0 and 100% of the pump capacity. The splitter is then mounted above the reactor and head tank which is used to store the liquid to be added. One outlet of the splitter is connected to the head tank, the second outlet of the splitter is connected to the reactor. The vent line of the splitter is connected with both the reactor and head tank. Before the reaction, the splitter is set in one extreme position so that 100% of the liquid is recycled back into the head tank. Thereafter, the pump is turned on and at the moment addition is desired, the splitter is reset to any value between 0-100%. Addition can be easily controlled and the desirable flowrate can be easily found. Most of the chemical reactions are exothermic and the maximal rate of addition is usually such a rate at which the reaction exotherm can be still controlled. This flow splitter arrangement resembles in its function a metering pump at a fraction of the cost of a metering pump.

Three general types of flow splitters are known to exist and are continuous splitters of falling streams, continuous splitters directly from a pipe orifice and discontinuous splitters. Most of the known splitters, however, are affected by problems normally associated with or stemming from the manner in which liquids are introduced into these splitters such as by flowing directly into the splitter through pipes or through falling stream flow irregularities. It is known that a given liquid flowing at a particular velocity through a pipe will have a characteristic velocity profile whose cross-section will resemble a parabola. Thus, the velocity of the liquid will be different at each point across the cross-sectional area with the velocity generally being higher at the center of the pipe than the velocity of the liquid next to the pipe surface. The cross-sectional analysis of the flow will be even more complicated as the pipe becomes only partially filled but the flow along the edges of the pipe will still generally be at a slower velocity than the flow closer to the center.

Therefore, to try and establish a preset flow-splitting ratio for an incoming stream which stream is flowing irregularly is very difficult. An initial splitting ratio for the liquid flow will be determined by where the splitting device is set for that initial flow, having considered the characteristics for that initial flow. This setting, however, will not correctly proportion the flow indefinitely since the setting will not change in a corresponding fashion to changes or irregularities in the cross-sectional area of the stream being split. In fact, the initial preset splitting ratio will correspond only in one case which will be the exception rather than the rule, that case being when the splitting ratio is set for the incoming flow at the specific initial velocity, when the pipe is full and the splitting device is located exactly in the middle of that incoming stream. In this instance, the splitting ratio would be 1:1, but if there were any change in either the velocity, the placement of the partition, the density of material being separated, internal pipe conditions, or perhaps even the temperature of the liquid or pressure behind the liquid, the initially set splitting ratio will be altered.

Theoretically, it should be possible to correlate the splitting of one stream into two streams according to the positioning of the splitting element, but applicant has found that this is only true for one liquid at the same physical conditions of flow, velocity, temperature, pressure, for real liquids. In fact, even if there were different liquids that were being split, the flow profile would have to be changed since while the same physical conditions would exist, the change of liquids will result in a different Reynolds number commonly referred to as $N_{re} = p\ dw/v$, where $p$ = density, d = diameter of the pipe, w = velocity of the flow and v = viscosity.

In addition, the surface of the inlet pipe needs to be taken into consideration and thus even the flow ratio, according to Reynolds numbers, can only be an approximation since the corrosion and wear along the interior surfaces of the inlet pipe will cause various flow changes.

Because prior art devices have not recognized nor solved the problems associated with the incoming flow irregularities, they cannot maintain the initial splitting ratio of the incoming flow between the outlet streams at any present value. Further, the prior art splitting is nonlinear and any continuous distribution will vary according to changes in the flow of the incoming liquid.

Turning now to the prior art, Gelderblom et al, U.S. Pat. No. 3,670,769 discloses an apparatus for the continuous adjustment of the reflux ratio of a distillation column. A partition 6 and a piston 5 would be positioned, one relative to the other, to provide a proportionate flow from two outlets 3 and 4, respectively. The partition would proportionalize the liquid directly as it enters the inlet 2 between outlets 3 and 4. As indicated above, because of the changes in the cross-sectional nature of the incoming stream, the movable partition would be effective only at flow rates split 1:1 or at relatively high flow rates because of the inherent instability of the layer if the liquid flow were slow, or of varying velocities. Likewise, the disclosed use of a weir in FIGS. 3 and 4 serve to slow down the separation of the incoming flow and further the continuous function and separation of this particular weir is limited to a certain combination of N and X where N equals the total number of notches and X equals the total number of notches on the right side of the partition so that the right-hand side would be N/S : N − X/N. In addition, the material being separated which in many instances is a corrosive material is in full contact with the entire apparatus shown in Gelderblom et al so that sealing of the apparatus to maintain the effective splitting function presents additional problems.

The Scheffler Jr. patent, U.S. Pat. No. 3,848,635 discloses a fluid distributor apparatus for use with such items as orchard sprayer devices which uses a disc 76 which is movable in a direction parallel to the axis of the tube with the disc serving to divide the flow entering from the fitting 69, so as to alter the flow from the right to the left or any proportion in between. The device is of relatively low accuracy and is of a non-linear design. Here again, the portion of the apparatus which is providing the splitting or proportionalizing function not only splits the fluid but provides the seal to prevent the two separated fluids from rejoining. Since the seals exposed directly to the incoming fluid is also exposed directly to corrosion and abrasion, the correct functioning of this device would require that the mechanical seal maintain its sealing qualities.

Edde et al, U.S. Pat. Nos. 2,625,952, Merchen 1,621,022 and Schaffer 1,082,287 all disclose similar apparatus which generally operate between extreme left and extreme right positions so as to cause liquids to flow in one of two directions. Either a movable funnel or partition is used to direct the flow between the two outlets and only Edde et al disclose the concept of having the movable funnel impinge its output on a plate so that the plate rather than the positioning of the funnel causes separation of the flowing liquid. With regard to each of these, the relative scales for causing some degree of control over the separation are not linear and each suffers from the previous problems mentioned with regard to the cross-sectional analysis of flows through pipes.

Mukherji, U.S. Pat. No. 3,122,157 discloses an adjustable flow control device which uses a movable partition to regulate the flow between two outlets. The movable partition cooperates with a vertical wall which acts as a weir but functions well only with high or large flow rates since at low flow rates, surface tension of the liquid will cause the fluid to not flow over the wall 4 of the weir in a uniform manner. The discontinuous flow at low flow rates are unpredictable and therefore correct positioning of the movable partition to obtain a correct and accurate proportionalizing of the liquid being separated is relatively impossible. In addition, the problem of sealing both the partition and the hinge which allows the partition to be movable, will affect the accuracy of the splitting apparatus.

The present invention solves incoming flow irregularity problems by creating a flat curtain-like stream so that the splitting of that flat curtain-like stream is linear. The linear splitting of the flow takes place beyond the orifice. And since the stream can be linearly split, the accuracy of the splitting process cannot only be greatly improved but can be kept at any present ratio. None of the sealing or moveable parts are exposed directly to the liquid.

The present invention consists primarily of a main chamber which is divided into two chambers by means of two partitions. One of the partitions acts as the splitting element and co-acts with a rotatably mounted liquid distributor. The distributor is essentially comprised of a flat surface or circular plate. An upstanding collar is provided around at least 180° of the circumference of this circular plate while the remainder of the circumference remains open. Preferably, the open portion extends for only 160° and it is this 160° opening which is aligned with respect to the splitting partition. Attached to the rim portion of the distributor is a collar into which the inlet tube projects. The upstanding collar forces the liquid to flow through the open part of the distributor (160°). Further this collar can be provided with a filament material or a screen to disperse the incoming liquid stream and thereby provide additional correction for variations in flow rates by causing the incoming liquid to be more accurately deposited on the distributor. The distributor is attached to a shaft which is rotatably mounted inside the collector assembly and attached to the bottom of that shaft is a scale which can be set so as to adjust the relationship of the opening along the edge of the distributor with respect to the splitting partition. As the incoming liquid intersects the flat surface of the distributor, it is formed into a flat curtain-like sheet or stream. Because of the upstanding rim extending about a portion of the periphery of the distributor, the liquid in the form of a flat sheet will flow out of the distributor along or across the opening in the distributor and thereafter be split by the splitting partition.

The vertical edge along the outer periphery of the distributor not provided with the upstanding rim is serrated and the flat stream or sheet which exits the 160° opening will pass over the serrations. The serrations correct any irregularities in the surface tension in the vicinity of the serrations so that the flat curtain-like stream will not be concentrated irregularly as would be the case if the surface were not serrated. The serrations allow the obtaining of a stable liquid curtain having a symmetrical and regular shape of a predefined cross-section thereby allowing the accurate linear proportionalizing of the curtain into two by the partition defining the chambers within the collection assembly.

The apparatus of this invention will now be explained in greater detail with reference to the drawings in which.

Figure 1:
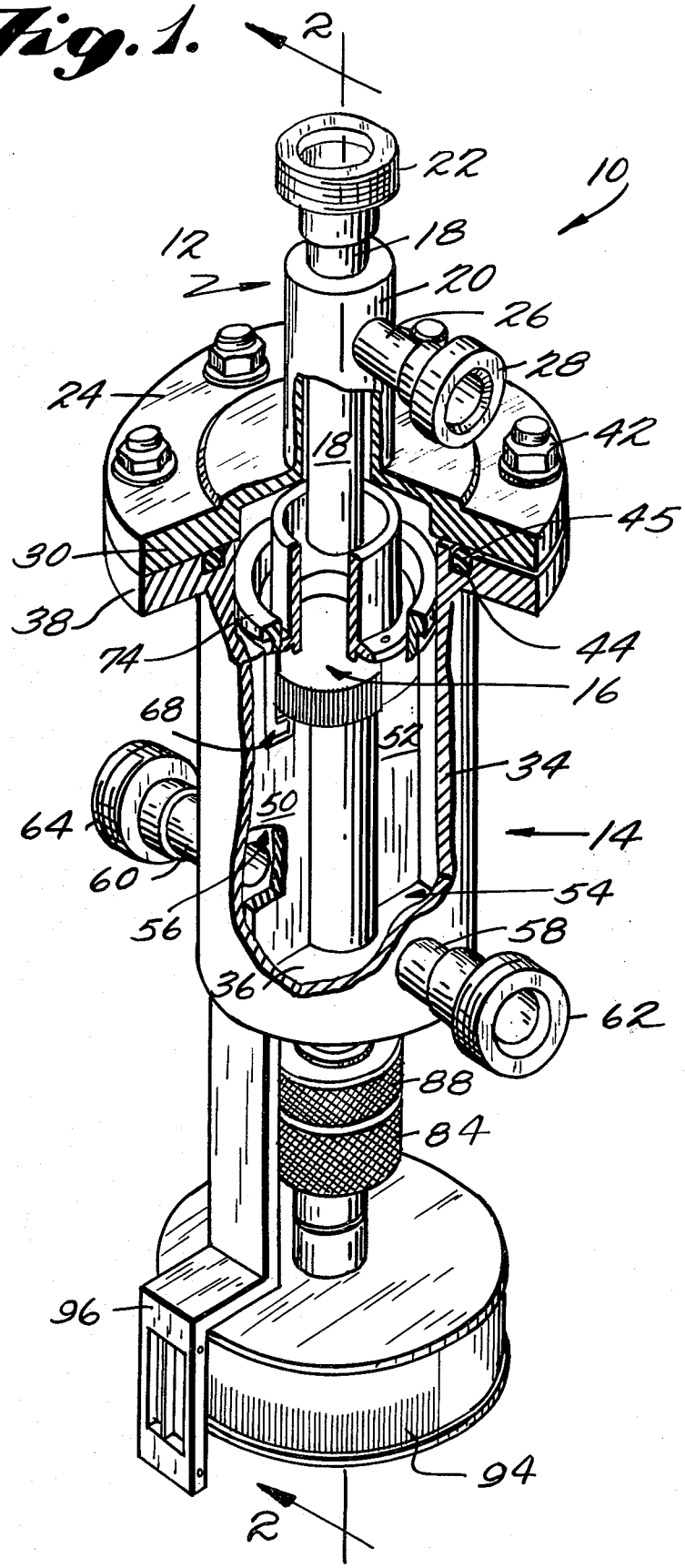
FIG. 1 is a diagrammatic, perspective view of one embodiment of the flow-splitting apparatus of the present invention.
Figure 2:
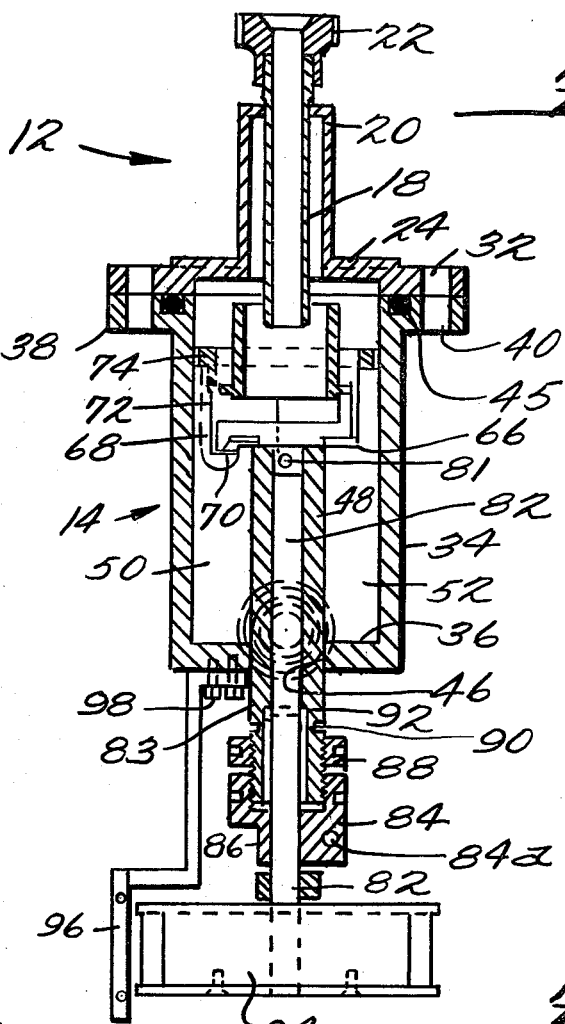
FIG. 2 is a diagrammatic, longitudinal cross-section taken substantially along the lines 2—2 in FIG. 1 with parts in section.

As shown in FIGS. 1 and 2, the flow-splitting apparatus of the present invention generally indicated at 10 is comprised primarily of three assemblies, an inlet assembly, generally indicated at 12, a collector assembly, generally indicated at 14 and distributing assembly, generally indicated at 16.

The inlet assembly 12 is comprised of an inlet tube 18 which is mounted within and preferably spaced interiorly from a cylindrical sleeve 20 so that there is a space between the interior portions of said sleeve 20 and the inlet tube 18. Inlet tube 18 is also provided with a coupling flange 22 located on the exterior end of tube 18. The sleeve 20 is mounted in a circular cover 24 so that the inlet tube 18 extends below the bottom surface of the cover 24 with both the sleeve 20 and the inlet tube 18 being located approximately in the center of the cover 24. A tube 26 is provided at the upper portion of the sleeve 20 and is provided with a coupling flange 28. Tube 26 could enter the device other than on sleeve 20, for example the tube could be connected directly to cover 24. The tube 26 can be used to provide either a vacuum or pressure atmosphere within the flow-splitting device 10 if such an atmosphere is deemed to be desirable. It is contemplated that the flow-splitter, as discussed herein, could operate under vacuum conditions such as, for example, $1 \times 10^{-3}$ mm Hg or alternatively under positive pressure of, for example, 150 psi. However, higher pressures up to 3,000 psi could also be used. In other instances, the interior of the flow-splitter 10 will operate at atmospheric pressure. The cover 24 is provided with an exterior flange 30 having a plurality of bolt holes 32.

The collector assembly 14 is comprised of an outer cylinder 34 having a bottom 36 and a flanged area 38 extending about the outer rim of the top portion of the cylinder 34. The flange area 38 is likewise provided with a plurality of bolt holes 40 such that when the top inlet assembly on the inlet assembly 12 is positioned on the cylinder 34 holes 32 and 40 will be aligned and bolts 42 or any other similar or convenient means can be used to join the inlet assembly 12 onto the collector assembly 14. In addition, the flange area 38 is provided with a circular channel 44 in which suitable sealing means such as O-ring 45 can be housed so as to provide suitable sealing between the inlet assembly 12 and the collector assembly 14.

The bottom 36 of the collector cylinder 34 is provided with an opening 46 in which an inwardly extending tubular sleeve member 48 is mounted such as by welding.

Partition walls 50 and 52 are welded or otherwise secured both to the tubular sleeve member 48 and to the interior side walls of cylinder 34 and bottom 36 of the collector cylinder 34. The partition walls 50 and 52 and the tubular sleeve member 48 serve to divide the collector cylinder into two chambers 54 and 56, respectively. Each of these chambers is provided with an outlet 58 and 60, respectively, which are provided with outlet couplings 62 and 64, respectively.

It will be noted that the partition 52 is provided with a substantially L-shaped cutout 66, in the upper portion of the partition so as to provide space for the mounting of the distributing assembly 16. The partition 50 is likewise provided with a cutout portion 68 which is shaped so as to provide narrowed horizontal and vertical edges 70 and 72, respectively, which are more clearly shown in FIG. 3. Narrowed edges 70 and 72 will cooperate with the distributing assembly 16 for the purpose of splitting the flat curtain-like stream or sheet flowing from the distributing assembly 16. While edges 70 and 72 do not have to be knife edges, the closer the edges 70 and 72 approximate a knife edge, the more accurate will be the splitting of the flow from the distributing assembly 16. Both narrowed edges 70 and 72 are spaced from the distributing assembly 16 by a distance of from about 0.05 inches to 0.2 inches. Mounted on top of partitions 50 and 52 by welding or in any other suitable manner is a ring-shaped baffle member 74 which will prevent the withdrawal of the liquid being separated if the flow-splitter 10 is being operated under vacuum conditions or splashing from one collecting chamber into the second chamber at high flow rates or when operating under positive pressure conditions.

Figure 3:
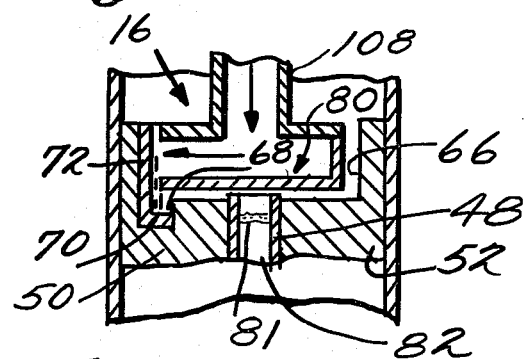
FIG. 3 is an enlarged partial cross-sectional view of the distributor assembly.
Figure 4:
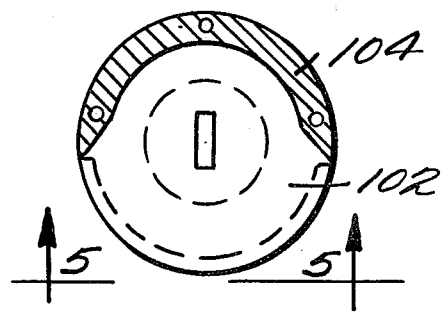
FIG. 4 is a top cross-sectional view of the distributor.

The distributing assembly 16 as is best shown in FIG. 3 is comprised of a circular platform 80 which is rotatably mounted within the collector cylinder 34 above the sleeve member 48 on a shaft 82 by pin 81 which extends within the sleeve member 48. A hollow tubular mounting column 83 extends downwardly away from the bottom 36 of the collector cylinder 34 and the lower outer surface of the mounting column 83 is threaded.

A nut 84 is secured in its position by means of a lock nut 88. A nut 84 is provided with a threaded interior which will engage the threaded portion of the mounting column 83. In addition, a lock nut 88 likewise threadedly engages the lower portion of the mounting column 83 and will serve to lock the position of adjusting nut 84 on the mounting column 83 at any desired position necessary for a proper sealing. A sleeve 90 is mounted between the shaft 82 and the mounting column 83 adjacent the adjusting nut 84 and likewise a sealing washer (O-ring) 92 is provided so as to seal the area between shaft 82 and the mounting column 83. Another function of the nut 84 is to secure the shaft 82 in desired position. The upper part of the nut is cut through, though it can be firmly squeezed by tightening of the bolt 84a.

Attached to the bottom of shaft 82 is a scale 94 and a scale aligning member 96 is attached to the bottom 36 of the collector cylinder 34 as by screws 98. The aligning member 96 is attached so as to be in alignment with the partition 50.

The following show examples of the types of scales contemplated for use herein:

Scale A

| RIGHT OFF | 20 10  ← 1:x | x:1 →  10 20 | LEFT OFF |
|---|---|---|---|
| | 30 15 7 5 4 3 2 | 1 2 3 4 5 7 15 30 | |

Scale B

| RIGHT 100% | 90 80 70 60 50 40 30 20 10 | 0 RIGHT |
|---|---|---|
| LEFT  0 | 10 20 30 40 50 60 70 80 90 | 100% LEFT |

In addition, a typical scale for use with the present invention when the present splitter is used as a reflux splitter is as follows:

REFLUX SCALE

| R | α | % | R | α | % |
|---|---|---|---|---|---|
| X:1 | | 0 | 1:X | | |
| 1:1 | 180 | 50 | 1:1 | 180 | |
| 2:1 | 153.33 | 66.66 | 1:2 | 206.66 | |
| 3:1 | 140 | 75 | 1:3 | 220 | |
| 4:1 | 132 | 80 | 1:4 | 228 | |
| 5:1 | 126.66 | 83.33 | 1:5 | 233.33 | |
| 6:1 | 122.86 | 85.71 | 1:6 | 237.14 | |
| 7:1 | 120 | 87.50 | 1:7 | 240 | |
| 8:1 | 117.77 | 88.88 | 1:8 | 242.22 | |
| 9:1 | 116 | 90 | 1:9 | 244 | |
| 10:1 | 114.54 | 90.90 | 1:10 | 245.45 | |
| 15:1 | 110 | 93.75 | 1:15 | 250 | |
| 20:1 | 107.62 | 95.24 | 1:20 | 252.38 | |
| 30:1 | 105.16 | 96.77 | 1:30 | 254.84 | |

-continued

| REFLUX SCALE | | | | | |
|---|---|---|---|---|---|
| R | α | % | R | α | % |
| :1 | 100 | 100 | 1: | 260 | |

Figure 5:
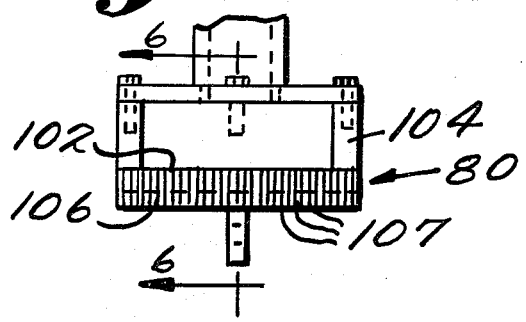
FIG. 5 is a front elevational view of the distributor as viewed from line 5—5 in FIG. 4.
Figure 6:
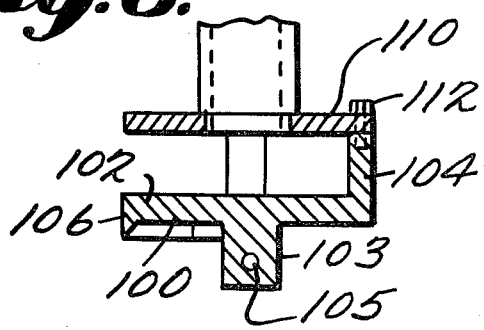
FIG. 6 is a cross-sectional view of the distributor taken along lines 6—6 in FIG. 5.

Turning now to FIGS. 3-6, the distributor platform generally indicated at 80 is comprised of a circular disc 100 having a flat upper surface 102 and a mounting lug 103 extending downwardly and away from the bottom of disc 100. The mounting lug 103 is provided with an opening 105 through which pin 81 can pass so as to secure distributor platform 80 to shaft 82. An upstanding rim 104 is provided around at least a portion of the periphery of disc 100 with the remaining portion of the periphery of disc 100 being open. The size of the opening around disc 100 will be less than 180° of the disc 100 with a preferred opening having an arc of approximately 160°. Thus, the upstanding rim 104 would extend at least around 180° of the circular disc 100, and preferably would extend around 200° of the disc 100. The scale 94 is coordinated with the open portion of the circular disc 100, i.e., that portion which not provided with an upstanding rim 104. Thus, scale 94 and the scale aligning member 96 serve to properly align the open portion of the circular disc 100 with partition 50 and thereby establish the splitting ratio. As shown in FIG. 5, the entire surface area of front wall 106 along the open portion of the circular disc 100 is provided with vertically extending serrations 107 so as to control the surface tension of the liquid and thus more uniformly direct the liquid as it leaves the flat upper surface 102 of the circular disc 100.

A collar 108 is provided with a flange 110 which is mounted to the upstanding rim 104 as by screws 112. The collar 108 serves to direct the flow of the incoming liquid from the inlet assembly 12 so that the incoming fluid will not splash out of the distributing assembly 16 and will serve to direct the flow of the fluid out of the distributing assembly 16 through the open portion along the circular disc 100.

Figure 7:
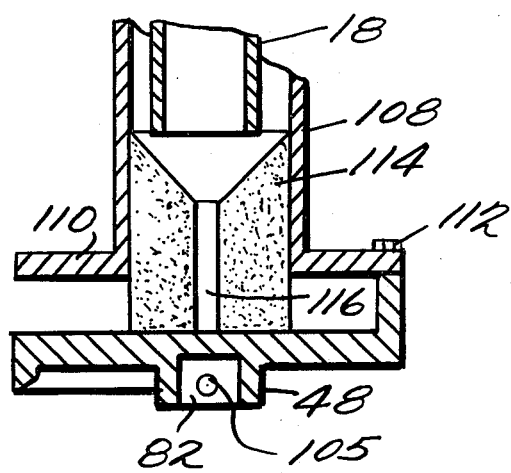
FIGS. 7, 8 and 9 are partial cross-sections of the inlet and distributing portions of the present flow-splitting apparatus and specifically show the filamentary material used within the inlet-portion of the device.
Figure 8:
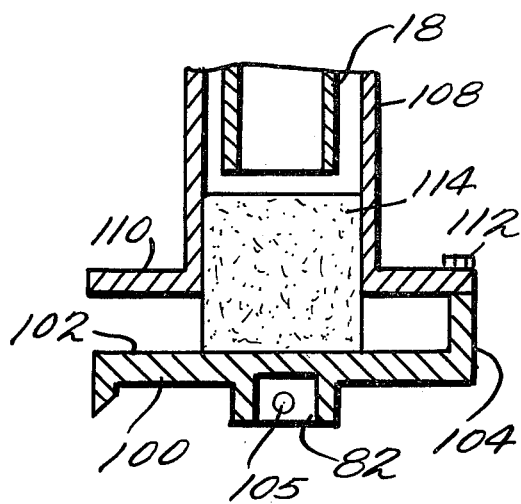
Figure 9:
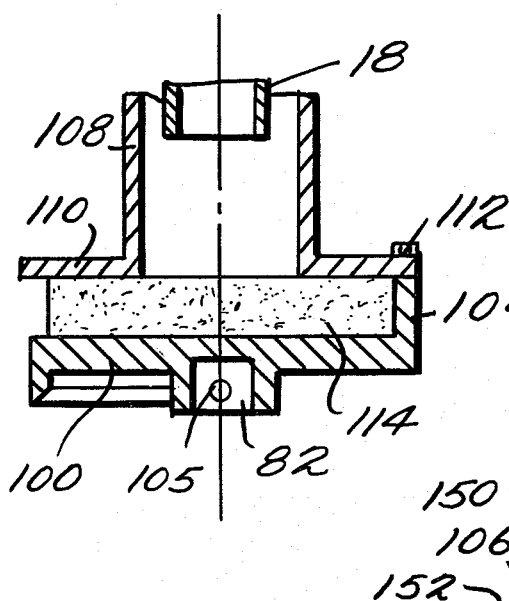

The collar 108 can also be provided with a filamentary material 114 to disperse or more evenly regulate the flow of the incoming liquid. The filamentary material 114 can be a screen or sieve woven from wire or wire cloth material or any other non-corrosive type material. In addition, the filamentary material 114, when used, can extend from within the collar 108 to the flat upper surface 102 of the distributing assembly 16 or as shown in FIG. 9, the filamentary material can be located in contact with and between the flat upper surface 102 and the flange 110 of collar 108. As shown in FIG. 7, the filamentary material 114 can likewise be provided with a centrally located opening 116 which will serve to center incoming stream of liquid that is flowing at a very slow velocity.

Thus, in operation, the incoming liquid will flow through the inlet pipe 18, through the collar 108, and on to the flat surface 102 of the circular disc 100. The collar 108 can be either empty or filled with the filamentary material 114 as was explained above. The liquid will be spread substantially evenly across the flat upper surface 102 of the circular disc 100 and will thus be evenly presented to the open arc, preferably of 160°, of the circular disc 100. The liquid will thereafter fall or flow over the edge of the disc 100 and into contact with the serrations 107 in the form of a flat curtain-like stream or sheet. Depending upon the flow rate being low or high, the curtain-like stream or sheet of liquid will come into contact with either the narrowed horizontal or narrowed vertical edge 70 or 72, respectively, which will divide the curtain-like stream into two parts with the proportion making up each part being determined by how the open arc of the circular disc 100 is set with respect to the partition 50. There will also be instances where the flow will be such that the curtain-like stream will come into contact with both the horizontal and vertical edges 70 and 72 with the splitting or proportionalizing being accomplished by both.

Because of the characteristics of the curtain-like stream flowing from the distributing assembly 16, the splitting of that flat stream will be linear so that the proportionalizing can be accomplished more accurately than with previous flow splitting devices. Further, actual splitting of the incoming liquid flow takes place at an area beyond the incoming orifice or inlet tube and thus takes place without being affected by the flow irregularities normally occurring therein.

While the flow-splitter of the present invention is preferably made of stainless steel 304 or 316, other available construction material could be also used. Examples of such materials are: aluminum, alloys (monel), carbon steel, copper, glass, silver, rigid plastics, etc. Also, all parts should be coated or lined with corrosion resistant polymers (teflon, kinar, etc.) or glass-lined. Nickel or chromium plating should also be applied. Coating should be either on internal parts and surfaces (where the liquids and/or vapors are in contact with splitter) or on both internal and external parts (to protect the flow-splitter against corrosive atmosphere which is common in most chemical companies). In a sharp contrast with any similar device, none of the sealing parts are involved in the process of the flow-splitting.

Figure 10:
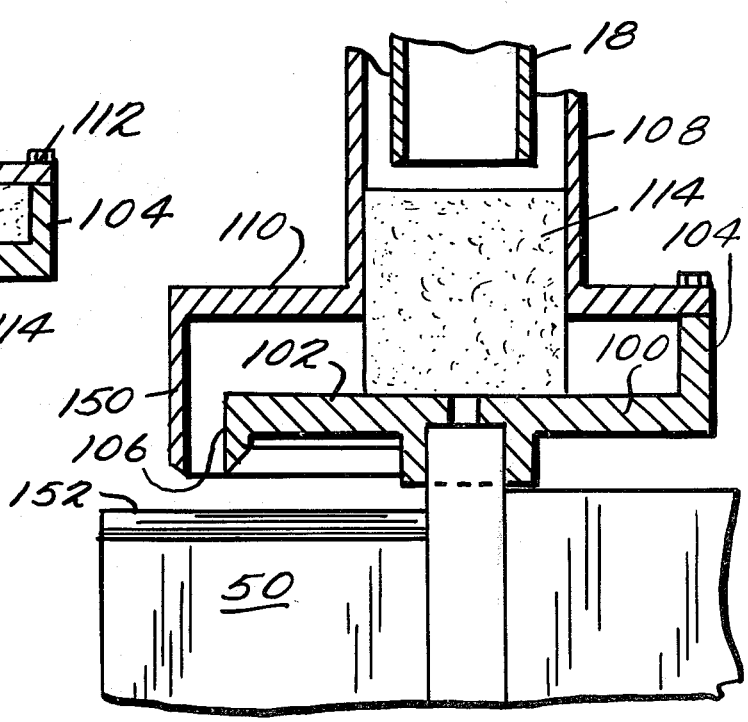
FIG. 10 shows an alternative embodiment of the distributor of the present invention.

As shown in FIG. 10, the flange 110 on collar 108 extends outwardly beyond the vertical plane formed by serrated surface 106 and is provided with a downwardly projecting rim 150. The rim 150 is spaced outwardly from circular disc 100, and from serrated surface 106 a distance sufficient to allow the liquid being separated to pass therebetween. In addition, the downwardly projecting rim 150 extends around that portion of the periphery of circular disc 100 which is open and provided with the serrated surface 106. The rim 150 preferably extends downwardly a distance equal to the bottom of the serrated surface 106. However, it is essential only that the rim 150 extend downwardly a distance sufficient to channel liquid flow downwardly between rim 150 and serrated surface 106 toward the top of partition 50. Since rim 150 channels liquid flow downwardly, partition 50 is not provided with an L-shaped cutout portion but rather has a horizontal top edge 152 which is narrowed or sharpened so as to approach a knife edge. Thus, the liquid flowing between rim 150 and serrated surface 106 will come into contact with the horizontal edge 152 and will be the split thereby. Further, the collar 108 can also be provided with a filamentary material 114 as described hereinbefore to evenly disperse the liquid flow.

Thus, while a preferred embodiment of the present invention has been illustrated and explained, the scope of the present invention is not limited to this illustrated embodiment since numerous modifications would be self-evident to a person skilled in the art, all of which are within the scope of the protection of the following claims.

What is claimed is:

1. A flow-splitting device for dividing a liquid flow into two output streams, said device comprising: inlet means for directing a liquid flow into said device; rotatable flow-forming means having a flat surface transverse to and facing said inlet means for forming said liquid flow into a flat sheet of a predetermined lateral extent; splitting means for linearly splitting said flat sheet into at least two portions; two collecting means respectively collecting the split portions; means for adjusting the relative position of said flow-forming means and said splitting means for proportioning the flow between the sheet portions; and an outlet for each of said collecting means so that liquids flowing at varying rates can be consistently split into a plurality of separate portions.

2. A flow-splitting device for dividing a liquid flow into two output streams, said device comprising: inlet means for directing a liquid flow into said device; flow-forming means for forming said liquid flow into a flat stream of a predetermined lateral extent; splitting means for linearly splitting said flat stream into at least two stream portions; two collecting means respectively collecting the split portions; means for adjusting the relative position of said flow-forming means and said splitting means for proportioning the flow between the stream portions; and an outlet for each of said collecting means wherein said flow-forming means comprises a circular plate having an outer side wall and a flat upper surface, said flat upper surface being provided with an upstanding rim about at least 180° of the periphery of said circular plate, said circular plate being mounted within said device so as to be rotatable about the axis thereof with the amount of rotation being determined by said adjusting means.

3. A flow splitting device as claimed in claim 2 wherein the side wall of said circular plate along the portion of said circular plate not provided with an upstanding rim is comprised of vertical serrations.

4. A flow splitting device as claimed in claim 2 wherein said upstanding rim extends about the periphery of said circular plate for at least 200° so that the portion of the periphery of said circular plate which is serrated extends for an arc of at most 160°.

5. A flow-splitting device as claimed in claim 2 wherein said flow-forming means further includes an upstanding collar mounted on said upstanding rim.

6. A flow-splitting device as claimed in claim 5 wherein said flow-forming means further includes filamentary material, said filamentary material extends at least between said flat upper surface and said collar.

7. A flow-splitting device as claimed in claim 5 wherein said splitting means comprises a partition having a horizontal top edge and wherein said flow-forming means further includes a downwardly projecting rim mounted on said collar, said downwardly projecting rim being spaced outwardly from said circular plate and extending about the periphery of said circular plate a distance equal to the serrated portion of the side wall of said circular plate so as to direct flow downwardly whereby said horizontal edge is positioned beneath said flow forming means so as to intercept and split said flow.

8. A flow-splitting device as claimed in claim 7 wherein said horizontal top edge is formed with a narrowed, sharp edge.

9. A flow-splitting device for dividing a liquid flow into two output streams, said device comprising: inlet means for directing a liquid flow into said device; flow-forming means for forming said liquid flow into a flat stream of a predetermined lateral extent; splitting means for linearly splitting said flat stream into at least two stream portions; two collecting means respectively collecting the split portions; means for adjusting the relative position of said flow-forming means and said splitting means for proportioning the flow between the stream portions; and an outlet for each of said collecting means wherein said splitting means comprises a vertical partition provided with an L-shaped cutout portion, said vertical partition being mounted within said device such that the flow-forming means is positioned within said L-shaped cutout portion whereby the flat stream will be intercepted by said L-shaped cutout portion of said partition.

10. A flow-splitting device as claimed in claim 9 where said L-shaped cutout portion of said vertical partition is comprised of narrowed horizontal and vertical portions.

* * * * *